United States Patent

[11] 3,594,749

| [72] | Inventor | Norman P. Bergeron<br>9245 S.W. 69th Ave., Portland, Oreg.<br>97223 |
|---|---|---|
| [21] | Appl. No. | 713,611 |
| [22] | Filed | Mar. 18, 1968 |
| [45] | Patented | July 20, 1971 |

[54] MONITORING SYSTEM FOR REFRIGERATED DISPLAY CASES
1 Claim, 2 Drawing Figs.

[52] U.S. Cl. ................................................. 340/227, 340/227.1, 340/332
[51] Int. Cl. ................................................. G08b 17/06
[50] Field of Search ......................................... 340/227, 227.1, 213, 332; 62/126

[56] References Cited
UNITED STATES PATENTS

| 2,917,731 | 12/1959 | Rodgers | 340/213 |
|---|---|---|---|
| 2,769,970 | 11/1956 | Kratville | 340/213 X |
| 2,916,730 | 12/1959 | Johnson, Jr. | 340/227.1 |
| 2,994,858 | 8/1961 | Coffer | 340/227.1 |
| 3,007,320 | 11/1961 | Henkel | 62/126 |
| 3,028,586 | 4/1962 | Reda | 340/227.1 |
| 3,260,063 | 7/1966 | Johnson | 62/126 |
| 3,311,906 | 3/1967 | Coffer et al. | 340/227 |

Primary Examiner—John W. Caldwell
Assistant Examiner—Perry Palan
Attorney—Givnan and Givnan ABSTRACT: A warning system is disclosed applicable to indicating higher than desired temperatures in a temperature controlled space such as refrigerated food storage cabinets. A master indicator unit includes means for identifying the particular food storage cabinet having the excessive temperature, such means being operable both during a timed defrost period and a period exceeding the defrost period wherein food spoilage may occur. Provision is made in the present warning system for indicating the failure of continuously operating components of a refrigeration system.

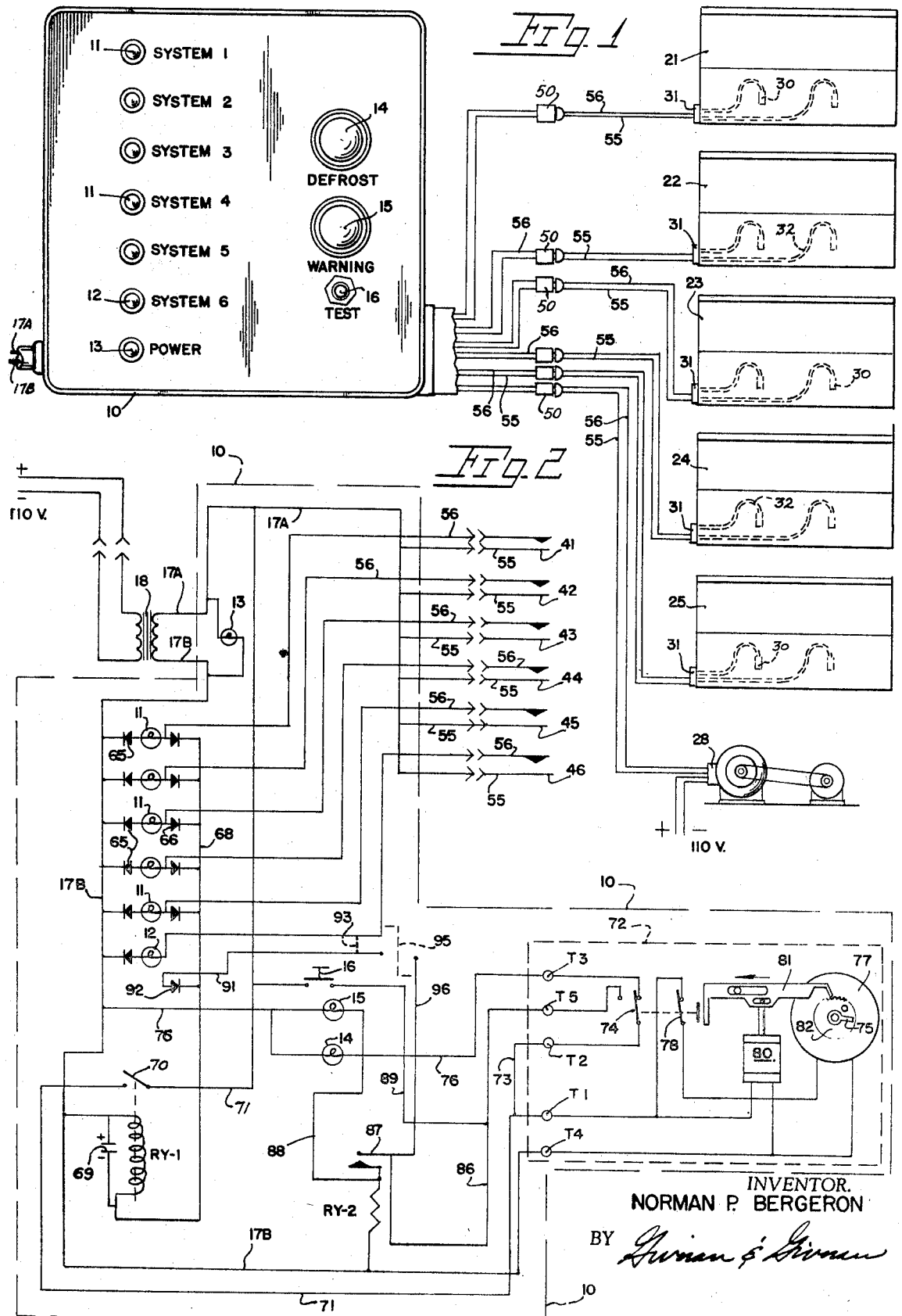

MONITORING SYSTEM FOR REFRIGERATED DISPLAY CASES

BACKGROUND OF THE INVENTION

The present invention relates to temperature warning systems and more particularly to a system for warning and indicating a temperature rise in a controlled area experiencing a malfunction. Signal means are included for indicating periods during which normal defrosting should take place and at the end of which a warning signal is activated.

The prior art of which I am aware has, in a general way, attempted to provide systems including time delay means which allow for the expiration of a defrosting period before giving of a warning. While prior systems do serve to indicate, after a defrost period, an unsatisfactory temperature in a food storage area they do not indicate the start, the defrosting period, nor do they identify which one of the usually several food storage areas or cabinets are defrosting subsequently or malfunctioning.

In view of the ever increasing proportion of food being sold in a frozen condition, food stores have found it necessary to devote considerable floor space to rows of self-service, open-top cabinets or cases. Accordingly, the many cabinets with their costly contents makes it highly desirable that store personnel have a centralized, visual display of each cabinet's status and a positive identification of any malfunctioning cabinet or display case. Depending somewhat on the type of food stored therein food spoilage may occur before the troubleshooting can be completed in other types of warning systems.

SUMMARY OF THE INVENTION

The present warning system is directed toward providing a display to a store personnel indicating the status of each of the usually several display cases or cabinets containing frozen foods. A master indicating unit includes separate means indicating starting and stopping of their normal defrost period along with warning means commencing at the expiration of a time period slightly in excess of a normal defrosting period. Additional indicator means may be put into circuit with continuously running components of the refrigeration system to give an immediate warning upon their failure.

An additional important object of the invention is to provide a low voltage warning system easily installed in existing refrigerated store equipment but electrically independent thereof and without costs that would be incurred utilizing a 110 volt power supply.

Additionally important to the present invention is the feature of providing contact means in the master indicating unit which permits the warning system to be particularly adapted to the type of installation by reason of a readily convenient terminal plate and jumper means being provided. Such jumper means may permit immediate actuation of a warning flasher for critical components whose malfunction must be immediately detected.

A further advantage of the present system is the incorporation into the system of a readily available timer device to achieve system reliability at a reasonable cost.

BRIEF DESCRIPTION OF THE DRAWING

In the accompanying drawing:

FIG. 1 is a front elevational view of the master indicator unit along with refrigerator display cabinets and other associated equipment shown schematically in circuit with said unit, FIG. 2 is an electrical schematic of the master control unit wiring and including a schematic of a timer housed therein.

DESCRIPTION OF PREFERRED EMBODIMENT

With continuing reference to the drawing wherein reference numerals indicate parts similarly identified in the following specification the reference numeral 10 indicates the master indicator unit, which is of a size permitting convenient installation, for example, on a shelf within a store manager's office. If desired the unit 10 may be located adjacent the store window for periodic surveillance during the night hours by a watchman A row of system as cabinet indicator lights is located along the left-hand side of the unit 10 face panel with the lights for systems 1 through 5 being indicated at 11 and an additional system light is indicated at 12 while at 13 a power-on light is provided. The light 12 for the sake of convenience should be of a color, preferably red, and different from the system lights. The right-hand side of the panel of the indicating unit 10 serves to mount a master defrost light 14 and a warning light 15 along with a push to test switch for checking the warning light as later described in detail. The foregoing lights illuminate in a predetermined order with failure of a light bulb being immediately detectable to enable averting costly food damage.

Supplying the unit 10 with electrical power is a conduit 17 whose leads 17A and 17B terminate in a secondary winding of a stepdown transformer indicated at 18 in FIG. 2 and shown located exteriorly of the indicating unit and reducing voltage to 24 volts.

With attention being redirected to FIG. 1, a series of refrigerated display cabinets or cases are indicated at 21, 22, 23, 24 and 25 with each also being referred to respectively as system 1 through system 5, with each of their temperature conditions being indicated by the corresponding system or cabinet indicator lights 11. Low voltage carrying wires interconnect the display cabinets through plug-in receptacles 50 with the indicator unit 10. An additional pair of wires is in circuit with, for example, the auxiliary contacts on a motor start switch indicated at 28. Motor start switches conventionally include auxiliary contacts that lend themselves to use in the present warning system and particularly for operation in the present instance with the light 12 identified as system 6. As later described light 12 may, if desired, be directed to an additional display cabinet instead of the motor component. The motor shown operatively connected in system 6 may be a pump motor or any other continuously operating component of the refrigeration system whose continued functioning is necessary to the operation of the refrigeration system.

In each of the refrigerator display cabinets 21 through 25, temperature sensors as at 30 are mounted preferably in an air intake duct of the cabinet. As shown in an exemplary manner the sensors may be mounted in a dual manner or even including additional sensor units for each display case. The temperature responsive sensing elements 30 are in communication with switch contacts, later described, housed within switch boxes 31 located on the cabinet, said switch contacts being in parallel whereby their closing upon a temperature rise will close a circuit upon the predetermined temperature being detected by either of the sensing elements 30 in a cabinet. Conventional in the art are sensing elements acting through a gas filled tube as at 32 to effect switch opening or closing by means of a bellows or diaphragm within the switch housing 31. From the foregoing it will be seen that if one or more of the display cabinets 21 through 25 experiences a temperature higher than that desired a movable contact indicated at 41, 42, 43, 44 or 45 (FIG. 2) and located within the switch housings 31 will be closed against its companion contact. Contact 46 is the movable contact utilized in the motor start switch 28.

The one side of the secondary of the transformer 18 is connected via lead 17A to the said movable contacts by means of leads as at 55. Return leads 56 connect each fixed contact with their respective cabinet indicator light 11. The opposite side of each light 11 is connected in parallel to the lead 17B through a diode 65. Additional diodes are indicated at 66, except for system 6, through which current will flow during half cycles to a conductor 68 to one side of a coil of a relay RY-1 and thence terminating at line 17B. Diodes at 66 constitute a first series of diodes while diodes 65 constitute a second series of diodes. A condenser 69 is wired across the relay RY-1 to assure its positive action throughout the full current cycle.

The warning system is believed best understood in conjunction with its operation and hence is described jointly with its additional components.

The relay RY-1 is actuated upon a cabinet experiencing a defrost temperature and serves to close normally open switch 70 in conductor 71 thereby directing a source of current from one side of the transformer along a conductor 71 to a terminal T-1 of a timer device 72. A bridge wire 73 extends from conductor 71 to a second terminal T-2 of the timer which terminal is connected to a normally closed load switch 74 in circuit with a timer terminal T-3. A wire 76 connects terminal T-3 back to the other side of the low voltage lead 17B through the defrost indicator light 14.

From the above it will be seen that upon closure of any of the thermostatic switches associated with each of the cabinets 21—25 or the motor switch 28, a cabinet indicator light will come on and in the case of the latter switch the red light for system 6 will be illuminated.

Simultaneously with the closure of relay RY-1 a circuit is also completed from T-1 through a normally closed motor limit switch 78 to timer motor 77 and from the motor back to a terminal T-4 and lead 17B. A solenoid 80 is wired across terminals T-1 and T-4 to engage a pawl 81 with the ratchet wheel 82 of the timer motor which pawl is movable in the direction indicated by the wheel to open limit switch 78 and the load switch 74 the latter constituting a contacting circuit for alternately completing a circuit to the defrost light and the warning light. The ratchet wheel 82 however is not rotated until a settable arm 75 on the motor shaft comes into contact with a pin on the wheel. The arm will be set to allow a timed period slightly greater than a defrost period to elapse before pin contact.

A timer device found entirely satisfactory for present use is one manufactured and sold by the Eagle Signal Company and more particularly identified as a Timoflex Reset Timer, "HD" Series, such a timer being well known to those in the art and further explanation is believed unnecessary.

The timer motor 77 will continue to operate as long as the relay RY-1 remains closed by reason of an abnormal or defrost condition existing in one or more of the cabinets 21—25. The settable arm driven by the timer motor is preset as aforesaid to not "time out" or travel into contact with the ratchet wheel pin during a normal defrost period in which case the arm automatically resets upon the circuit to the motor being interrupted as by opening of RY-1. This, of course, occurs when the normal defrost period has elapsed and the cabinet temperature again lowers to open contacts in its switch housing 31. The circuit to solenoid 80 is also interrupted at this time to disengage the pawl 81 from the ratchet wheel 82.

The warning light 15 is illuminated upon one of the cabinets 21—25 being above a desired temperature for a period of time such as would cause food spoilage and in excess of a normal defrost period. Additionally, with the warning light the associated system light 11 will remain on to identify the malfunctioning cabinet.

Assuming the defrost time period has been exceeded and the settable arm of the timer has picked up the ratchet wheel pin with the wheel 82 ultimately moving the pawl 81 to open switches 74 and 78 a circuit is now established through terminal T-5, a line 86, a movable contact 87 of a second relay RY-2, a wire 88, warning light 15 and wire 76 terminating at lead 17B. Relay RY-2 is embodied in the form of an amperite flasher including a heatable metallic component for periodic actuation of contact 87.

For testing of the relay RY-2 and the warning light 85 the push button switch 16 on the unit 10 which is connected via wire 89 to the light is momentarily depressed.

The light 12 of system 6 as previously described is for indication of the malfunctioning of a continuously operating component of the refrigeration system and accordingly should be of a red color to give an immediate signal of the component's failure such as would occur upon tripping of the motor start switch 28.

An additional conductor is indicated at 91 which passes through a diode 92 terminating in conductor 68. The line 91 terminates at its opposite end in a terminal on a main junction plate within the unit 10. If it is desired to utilize system 6 with a refrigerated display case in the same manner as systems 1—5, such is accomplished by simply placing a jumper wire, shown in broken lines at 93, from the return line 56 of system 6 across to line 91 thus bringing the diode 92 into use.

A further change in system 6 is readily accomplished and includes the provision of immediate activation of the flashing warning light 15 upon failure of a continuous operating component by still another conductor 96 being put into use. A jumper wire 95 is easily added at the unit's main junction plate to interconnect the lead 56 of system 6 directly to the flasher contact 87 for immediate actuation of the warning light 15 upon component failure.

I claim:
1. A monitoring system for a plurality of refrigerating cabinets each having a separate time controlled defrosting system operating independently of said monitoring system for providing a defrosting period of increased temperature, said monitoring system comprising, a master indicating unit having a plurality of indicating lights operably connected to each of said cabinets, a defrost light and a warning light, thermally responsive switch means operably connected with each of said cabinets and actuatable by the increased temperature in the respective cabinet with said switch means electrically connected to one side of an electrical power source, each of said cabinet indicating lights having one lead electrically connected to the other side of the electrical power source and another lead being electrically connected to each of said thermally responsive switch means, resettable timing means having a timing period of predetermined duration which is longer than said defrosting period, circuit means including a relay, relay switch means, means for energizing said defrost light, means for initiating operation of said timing means when any one of said thermally responsive switch means is actuated and means for energizing the cabinet indicating lights corresponding to each thermally responsive switch means when the latter means is closed at the beginning of the defrost period, said circuit means further including a first series of diodes interposed one each between each of said cabinet indicating lights and said relay on one side thereof.